US007292765B2

(12) United States Patent
Sato (10) Patent No.: US 7,292,765 B2
(45) Date of Patent: Nov. 6, 2007

(54) OPTICAL FIBER HOLDING APPARATUS AND OPTICAL FIBER FUSION-SPLICING APPARATUS INCLUDING THE SAME

(75) Inventor: Ryuichiro Sato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/501,239

(22) Filed: Aug. 9, 2006

(65) Prior Publication Data

US 2007/0036508 A1    Feb. 15, 2007

(30) Foreign Application Priority Data

Aug. 9, 2005    (JP) .......................... P2005-231040

(51) Int. Cl.
*G02B 6/00* (2006.01)
*G02B 6/255* (2006.01)

(52) U.S. Cl. ................. 385/137; 385/136; 385/97; 385/98

(58) Field of Classification Search ............... 385/134, 385/136, 95–99, 137
See application file for complete search history.

(56) References Cited

U.S. PATENT DOCUMENTS

| | | | | |
|---|---|---|---|---|
| 4,537,466 A | * | 8/1985 | Moisson et al. | ............ 385/137 |
| 5,395,025 A | * | 3/1995 | Borer et al. | .................. 225/2 |
| 5,524,167 A | * | 6/1996 | Ewert et al. | ............... 385/137 |
| 6,668,128 B2 | * | 12/2003 | Hattori et al. | .............. 385/136 |
| 7,158,712 B2 | * | 1/2007 | Chou et al. | ................. 385/137 |

2004/0190839 A1    9/2004 Bush et al.

FOREIGN PATENT DOCUMENTS

| | | |
|---|---|---|
| JP | 63-233346 | 9/1988 |
| JP | 7-140342 | 6/1995 |
| JP | 11-52164 | 2/1999 |
| JP | 2001-208931 | 3/2001 |
| JP | 2002-362936 | 12/2002 |

OTHER PUBLICATIONS

Search Report dated Jan. 16, 2007.

* cited by examiner

*Primary Examiner*—Brian Healy
*Assistant Examiner*—Charlie Peng
(74) *Attorney, Agent, or Firm*—McDermott Will & Emery LLP (57) ABSTRACT

The present invention relates to an optical fiber holding apparatus and the like, which has a structure for stably holding optical fibers with a satisfactory force without interfering with other components even when the apparatus is miniaturized. The optical fiber holding apparatus includes a stage for loading a front-end portion of the optical fiber and a lid section for sandwiching the optical fiber together with the stage. The lid section is rotatably connected with one end of an arm, and a fiber holding section is provided at the other end of the arm. The arm extends along the loading direction of the optical fiber and has such a length that the other end thereof is positioned outside of the lid section. Owing to this arrangement, the optical fiber to be held is pressed onto the stage at a further front-end side than the portion sandwiched by the stage and the lid section. As a result, a buffering space is ensured for avoiding interference with other components between the lid section and the optical fiber end face.

5 Claims, 7 Drawing Sheets

OPTICAL FIBER HOLDING APPARATUS AND OPTICAL FIBER FUSION-SPLICING APPARATUS INCLUDING THE SAME

BACKGROUND OF THE INVENTION

1. Field of the Invention

The present invention relates to an optical fiber holding apparatus used for fusion-splicing optical fibers in a state that the respective ends of the optical fibers are butted against each other, and an optical fiber fusion-splicing apparatus including the same.

2. Related Background Art

Some types of optical fiber fusion-splicing apparatus connect, so-called, loose tube fibers each having coated optical fiber inserted into a tube. For example, Japanese Patent Application Laid-Open No. 2001-208931 discloses an optical fiber holding apparatus mounted on an optical fiber fusion-splicing apparatus, which connects loose tube fibers to each other by fusion-splicing the coated optical fibers inserted into a tube. The optical fiber holding apparatus described in the above document comprises a tube clamp, a fiber clamp and a clamp chassis. Here, the tube clamp holds a tube of a loose tube fiber loaded on a chuck stage. The fiber clamp holds the coated optical fiber of the loose tube fiber (in a state that the front end portion thereof is exposed out of the tube). The clamp chassis is connected to the tube clamp via a tube clamp spring and connected to the fiber clamp via a fiber clamp spring.

SUMMARY OF THE INVENTION

The present inventors have examined the above prior art, and as a result, have discovered the following problems.

That is, recent optical fiber fusion-splicing apparatus are in a trend toward miniaturization to respond to market demands. Therefore, in many optical fiber fusion-splicing apparatus, the optical fiber holding apparatus and the electrode rod supporting base or the like are disposed being spaced from each other at an extremely small distance.

However, in the conventional optical fiber holding apparatus disclosed in the above Japanese Patent Application Laid-Open No. 2001-208931, components such as the fiber clamp spring and the clamp chassis are disposed above the fiber clamp for holding the coated optical fiber. Therefore, in the case where the distance between the optical fiber holding apparatus and the electrode rod supporting base or the like is extremely small, when the clamp chassis is opened and closed to take out the loose tube fiber from the optical fiber holding apparatus after completing the fusion-splicing, the clamp chassis is apt to interfere with the electrode rod supporting base or the like.

On the other hand, in order to avoid the interference between the clamp chassis and other component, when the respective components of the optical fiber holding apparatus are miniaturized while maintaining the structure of the conventional optical fiber holding apparatus, the size of the fiber clamp spring is restricted. In this case, the spring force of the fiber clamp spring cannot be helped from resulting in reduction of the press force of the fiber clamp for holding the coated optical fiber. As a result, for example, in an optical fiber fusion-splicing apparatus having a proof test function of fiber tensile strength, satisfactory holding force of the coated optical fiber cannot be obtained. That is, slippage of the coated optical fiber occurs resulting in incorrect tensile test.

The present invention has been made to solve the above problems. It is an object of the present invention to provide an optical fiber holding apparatus, which has such a structure that, even when the apparatus is miniaturized, stably holds the front-end portion of optical fibers to be fusion-spliced with a satisfactory force without interfering with other components, and an optical fiber fusion-splicing apparatus including the same. Note that, in this specification, when not otherwise mentioned, the wording "optical fiber" alone means a glass fiber comprising a core and a cladding (hereinafter, referred to as bared fiber), or a coated optical fiber obtained by coating a resin on the outer surface of the bared fiber.

In order to stably hold at least the front end portion of the optical fibers even when the apparatus size is changed, in particular, miniaturized, the optical fiber holding apparatus according to the present invention comprises a stage, a lid section, an arm and a fiber holding section. The stage has a loading plane on which the front-end portion of the optical fiber is loaded and a loading structure for loading the front-end portion of the optical fiber along a predetermined direction. The loading structure is provided on the loading plane of the stage. The lid section is connected to the stage with one end thereof in a rotatable state so as to take a plurality of postures with respect to the stage. In particular, the postures to be taken by the lid section include, at least, a first posture sandwiching the front-end portion of the optical fiber together with the stage, and a second posture exposing the loading plane of the stage. In addition, the arm has one end, which is rotatably connected to the abutment face of the lid section facing the loading plane of the stage in the first posture. On the other hand, the other end of the arm is provided with a fiber holding section. The arm extends along the direction that the optical fiber loaded on the stage extends, and has such a length that the other end thereof is positioned outside of the abutment face of the lid section. The fiber holding section, which is provided at the other end of the arm, functions to press a part of the optical fiber onto the loading plane of the stage in the first posture.

The optical fiber holding apparatus according to the present invention may further comprise an elastic member, which imparts a force to the arm for pushing out the other end of the arm from the loading plane of the lid section. To this end, the elastic member is disposed between the lid section and the arm. On the other hand, in the optical fiber holding apparatus according to the present invention, the lid section preferably includes a stopper member for restricting the movement of the other end of the arm with respect to the loading plane of the lid section. The stopper is provided at the abutment face of the lid section.

As described above, the elastic member for imparting a force for pressing the optical fiber onto the stage (fiber holding force) to the fiber holding section is provided in a portion not immediately above the fiber holding section but at a position away from the fiber holding section (at the one end side of the arm fixed in a rotatable state). Accordingly, since a part of the lid section does not have to be disposed immediately above the fiber holding section, a space (buffering space for reducing interference with other components) is ensured immediately above the fiber holding section. Therefore, for example, when the optical fiber holding apparatus according to the present invention is mounted on an optical fiber fusion-splicing apparatus, in view of miniaturization of the optical fiber fusion-splicing apparatus, the optical fiber holding apparatus and other components such as the electrode rod-supporting base can be disposed with an extremely small distance. Under such circumstances, the structure of the optical fiber holding apparatus can prevent the lid section from interfering with other components while the lid section is opened/closed.

Moreover, the one end of the arm is rotatably connected to the lid section and, between the arm and the lid section, the elastic member for pushing out the other end of the arm is disposed. The lid section is preferably provided with a stopper for restricting the movement of the other end of the arm. In the first posture, the biasing force of the elastic member acting on the arm is transmitted to the fiber holding section, and a fiber holding force is generated between the fiber holding section and the loading plane of the stage. On the other hand, in the second posture, although only the biasing force of the elastic member acts on the arm, the stopper provided at the lid section restricts the movement of the other end side in the arm. Therefore, even in the structure such that the elastic member and the lid section are disposed at a position away from the fiber holding section, the biasing force of the elastic member is converged and transmitted to the fiber holding section only; thus a satisfactorily strong holding force is stably generated against the optical fiber.

In the optical fiber holding apparatus according to the present invention, the arm has such a shape that, when the lid section and the stage are in the state of the first posture, the portion excluding the other end provided with the fiber holding section is shaped from the loading plane of the stage. This arrangement is particularly effective when holding a loose tube fiber the optical fiber of which is received within a tube having a predetermined diameter. That is, the arm has such a shape that, when the fiber holding section holds the front-end portion of the optical fiber onto the stage in a state that the loose tube fiber, which has the front end portion of the optical fiber exposed from the tube, is loaded on the loading plane of the stage, a space is formed between the tube and the fiber holding section. In such a structure that, in a state that the fiber holding section holds the front end portion of the optical fiber onto the stage and the arm comes into contact with the tube, for example, when the tube is hard to be deformed, the arm is prevented from being pushed out by the tube itself, and accordingly satisfactory force of the fiber holding section to press the optical fiber may not obtained. However, in the above-described arrangement of the optical fiber holding apparatus, the fiber holding section holds the front-end portion of the optical fiber exposed from the tube onto the stage without abutting on the tube. Therefore, even when the tube is hard to be deformed, the front-end portion of the optical fiber can be held by the fiber holding section with a satisfactory force.

In the optical fiber holding apparatus according to the present invention, the fiber holding section, which is provided at the other end of the arm, preferably includes a cushioning member provided on the surface, which faces the loading plane of the stage in the first posture. In this case, owing to such arrangement, even when the fiber holding section holds the front-end portion of the optical fiber, the optical fiber itself is effectively prevented from being damaged.

Furthermore, the optical fiber fusion-splicing apparatus according to the present invention has a structure for fusion-splicing optical fibers, the end faces of which are butted against each other. In particular, a pair of optical fiber holding apparatuses (first and second optical fiber holding apparatuses) each having the above-described structure and a discharge means are provided. The first and second optical fiber holding apparatuses are disposed on a predetermined installation surfaces so that the directions of the front-end portions of the loaded optical fibers coincide with each other.

The discharge means discharges into the space sandwiched between the first and the second optical fiber holding apparatuses. Owing to the discharge, the end faces of the optical fibers, which are butted against each other, are heated and fusion-splicing between the optical fibers is made possible.

Particularly, in order to miniaturize the optical fiber fusion-splicing apparatus mounted with the optical fiber holding apparatuses, which have the above-described structure, even when the optical fiber holding apparatuses and other components such as electrode rod supporting bases are disposed with an extremely small distance, the lid sections can be prevented from interfering with other components while the lid sections are opened/closed (change from the first posture to the second posture, or change from the second posture to the first posture). In addition, the biasing force of the elastic member is converged and transmitted onto fiber holding section only, thus a satisfactorily strong holding force can be generated on the optical fibers to be held.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of an optical fiber holding apparatus and an optical fiber fusion-splicing apparatus according to the present invention will be explained in detail with reference to FIGS. 1 to 7. In the description of the drawings, identical or corresponding components are designated by the same reference numerals, and overlapping description is omitted. Also, in the following description, only the optical fiber fusion-splicing apparatus, which connects loose tube fibers by fusion-splicing between the coated optical fibers inserted into tubes, and the optical fiber holding apparatus will be given as typical embodiments.

Figure 1:
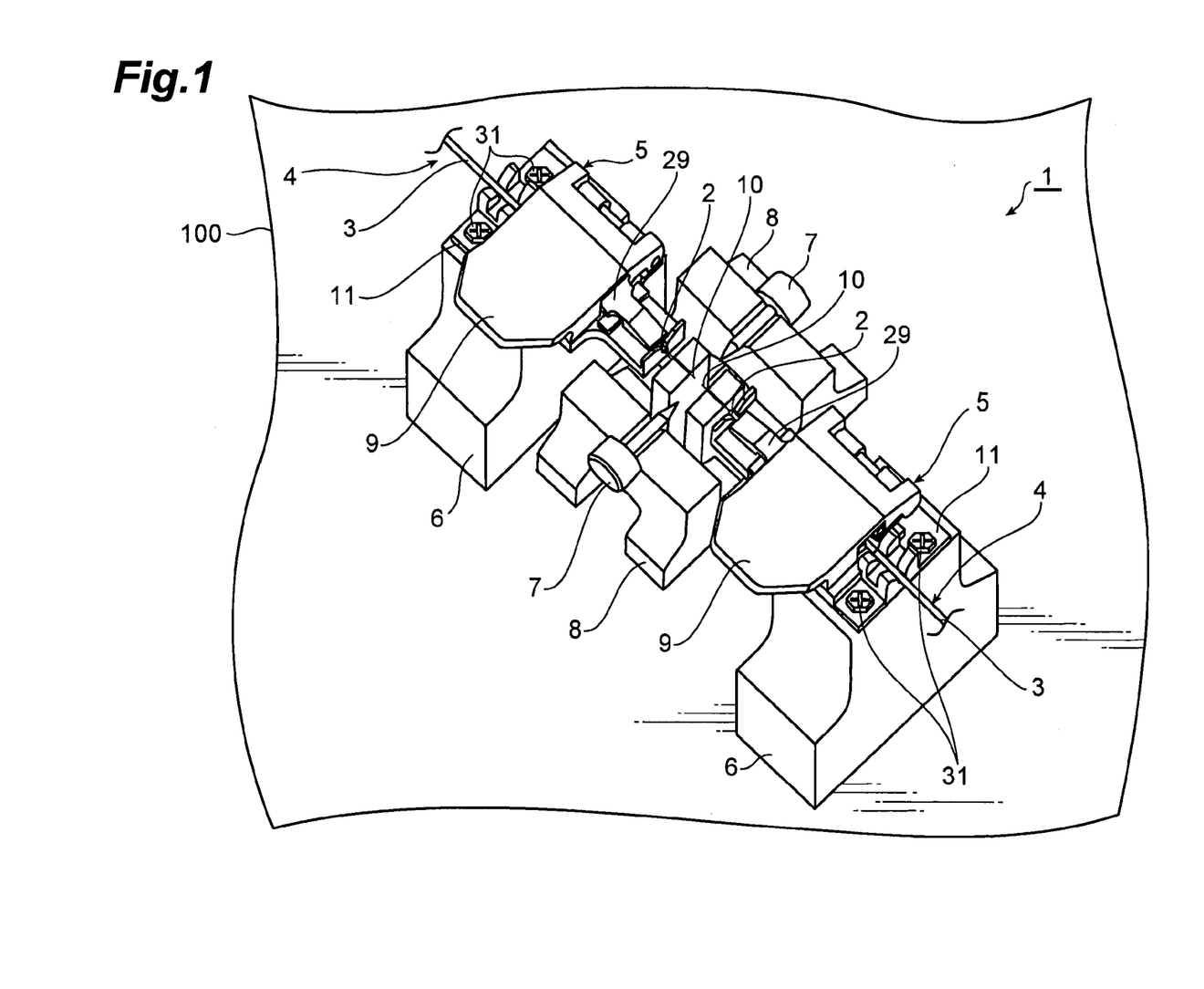
FIG. 1 is a perspective view schematically showing the structure of an embodiment of an optical fiber fusion-splicing apparatus according to the present invention.

FIG. 1 is a perspective view schematically showing the structure of an embodiment of the optical fiber fusion-splicing apparatus according to the present invention. The optical fiber fusion-splicing apparatus 1 shown in FIG. 1 is an apparatus that performs fusion-splicing between the coated optical fibers 2, which are inserted into tubes 3 in a loose state, by means of electrical discharge to connect loose tube fibers 4 (hereinafter, simply referred to as loose fiber) to each other. The optical fiber fusion-splicing apparatus 1 is installed on an installation plane 100 of a base and includes a pair of optical fiber holding apparatuses 5, support bases 6, a pair of electrode rods 7 and electrode rod supporting bases 8. Here, the pair of optical fiber holding apparatuses 5 holds the respective loose fibers 4. The support bases 6 support the respective optical fiber holding apparatuses 5. The pair of electrode rods 7 is disposed between the optical fiber holding apparatuses 5 for heating the loose fibers 4. The electrode rod supporting bases 8 support the electrode rods 7 respectively.

Figure 2:
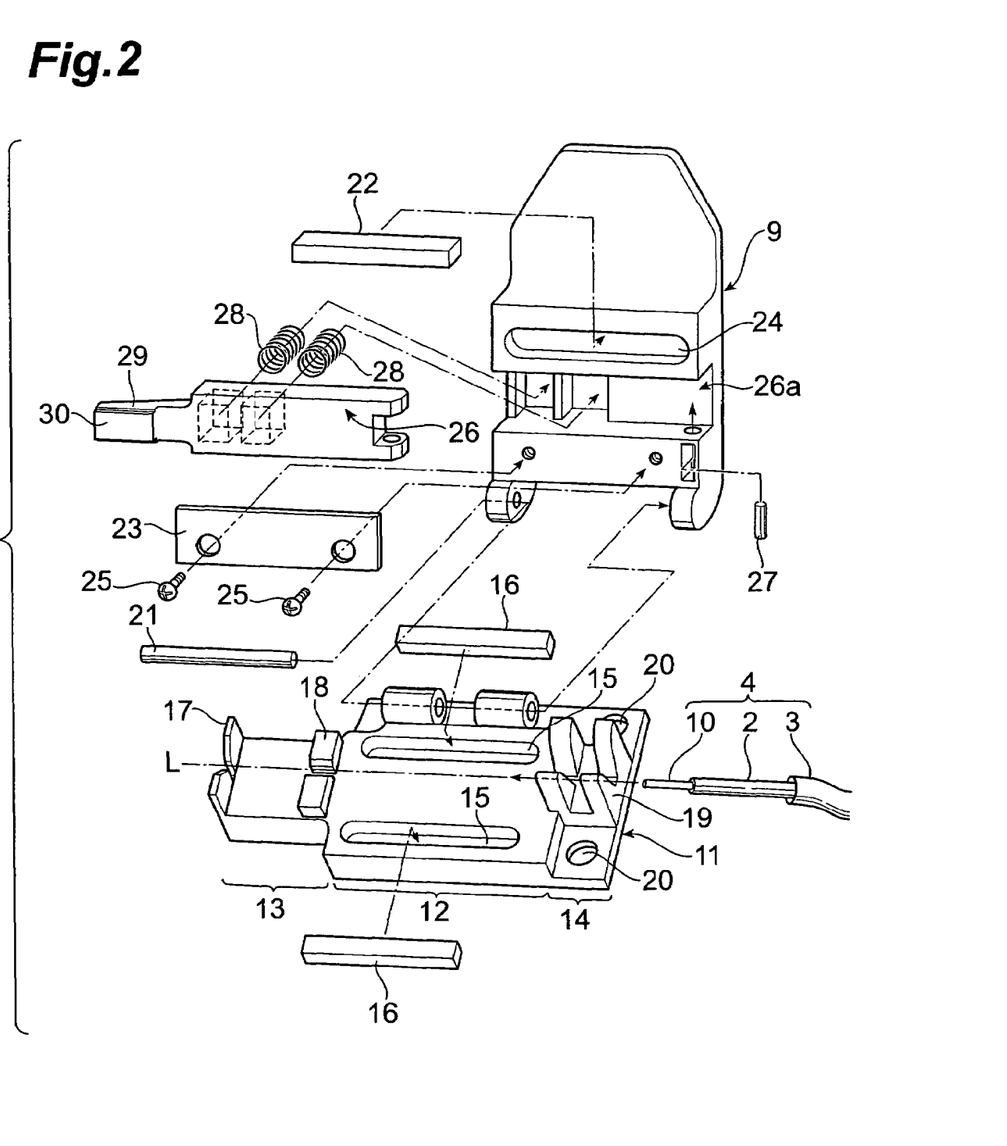
FIG. 2 is an assembling process chart for illustrating the structure of an optical fiber holding apparatus according to the present invention (included in the optical fiber fusion-splicing apparatus according to the present invention)

FIG. 2 is an assembling process chart for illustrating the structure of the optical fiber holding apparatus according to the present invention (included in the optical fiber fusion-splicing apparatus according to the present invention). Note that, in FIG. 2, only one of the pair of optical fiber holding apparatuses 5 is shown; since the structure is identical to each other, the other is omitted.

The loose fiber 4, which is held by the optical fiber holding apparatus 5, comprises a coated optical fiber 2 and a resinous tube 3 through which the coated optical fiber 2 is inserted. Here, the coated optical fiber 2 includes a bared fiber 10 and a UV coating provided on the outer surface of the bared fiber 10. Moreover, the bared fiber 10 comprises a core mainly composed of silica glass and acting as an optical waveguide region, and a cladding provided on an outer periphery of the core. The end of the loose fiber 4 is processed so that the coating portion of the coated optical fiber 2 comes out of the tube 3 by a length of, for example, 10 mm; and the bared fiber 10 comes out of the coating portion by a length of, for example, 10 mm.

The optical fiber holding apparatus 5 comprises a stage 11 on which the loose fiber 4 is loaded along an axis line L in the substantially horizontal direction. The stage 11 has a main body 12, a holding section 13, which is provided at one end side of the main body 12 for holding the coated optical fiber 2 of the loose fiber 4, and a fixing portion 14, which is provided at the other end side of the main body 12 and fixed to the support base 6. Here, the holding section 13 has a shape protruding with respect to the main body 12.

In the upper face of the main body 12 (a part of the loading plane of the stage on which the loose fiber 4 is loaded), two grooves 15, which extend parallel with the axis line L, are provided side-by-side. In the respective grooves 15, for example, a magnet 16 having a rectangular solid shape is embedded. In the upper face of the one end portion of the holding section 13, a fiber guide 17 for positioning the coated optical fiber 2 is provided. Also, at the upper face of the other end portion of the holding section 13, a positioning section 18 for positioning the front-end portion of the tube 3 is provided.

At the upper face of the fixing portion 14, a tube guide 19 for positioning the tube 3 is provided. Also, in the fixing portion 14, two holes 20, which allow screws 31 for fixing the optical fiber holding apparatus 5 on the support base 6 (see FIG. 1) to go therethrough, are formed so as to sandwich the tube guide 19.

As described above, a loading means is constituted by the fiber guide 17, the positioning section 18 and the tube guide 19 disposed along the axis line L on the stage 11. The loose fiber 4 can be loaded relatively easily to a desired position on the loading plane of the stage 11 by providing the loading means on the loading plane of the stage 11 as described above. Note that the loose fiber 4 is loaded at a position between the two magnets 16 on the stage 11.

Figure 3:
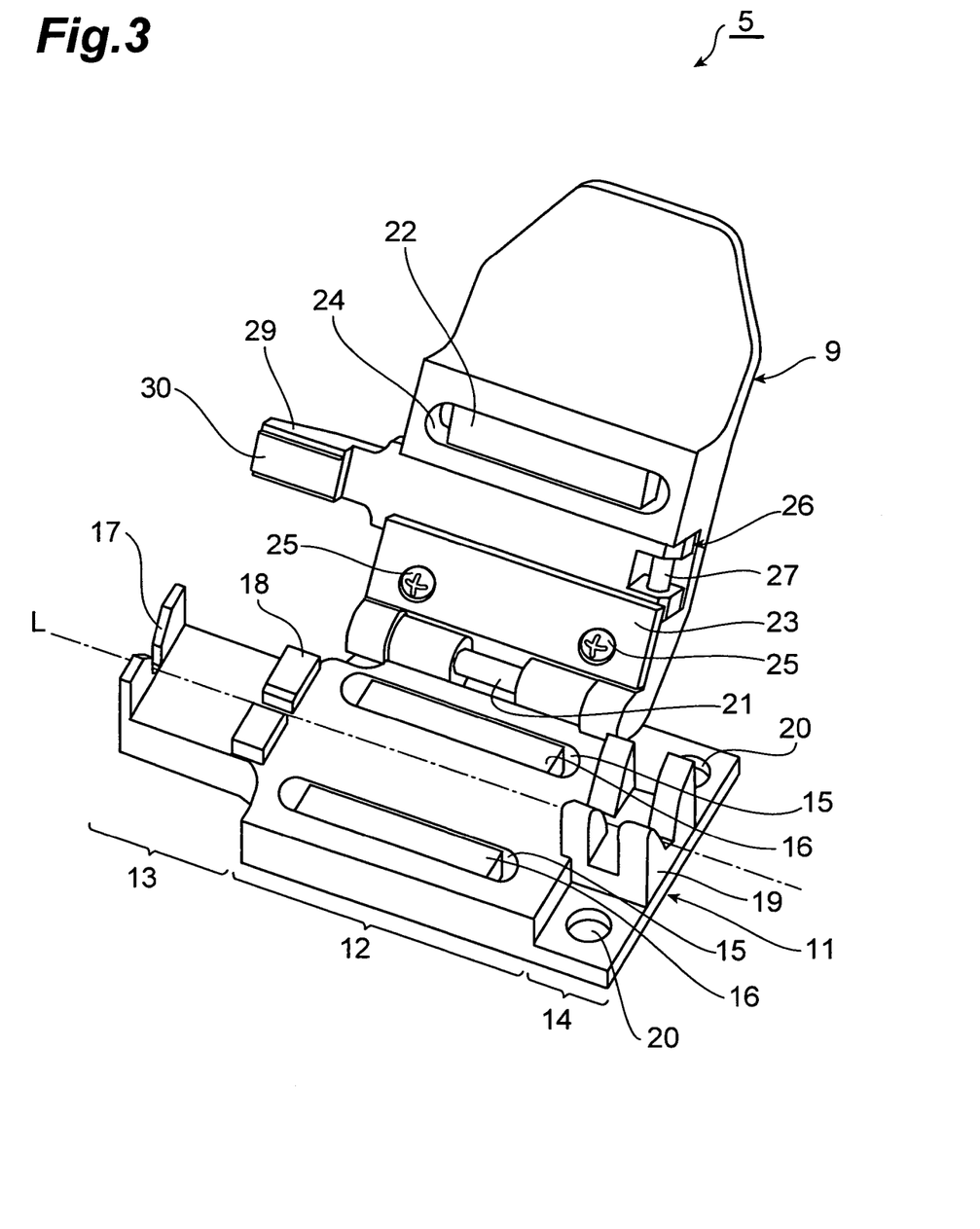
FIG. 3 is a perspective view of the assembled optical fiber holding apparatus shown in FIG. 2 showing the optical fiber holding apparatus in which a stage and a lid section are set to a second posture (a state that a loading plane of the stage is exposed)
Figure 4:
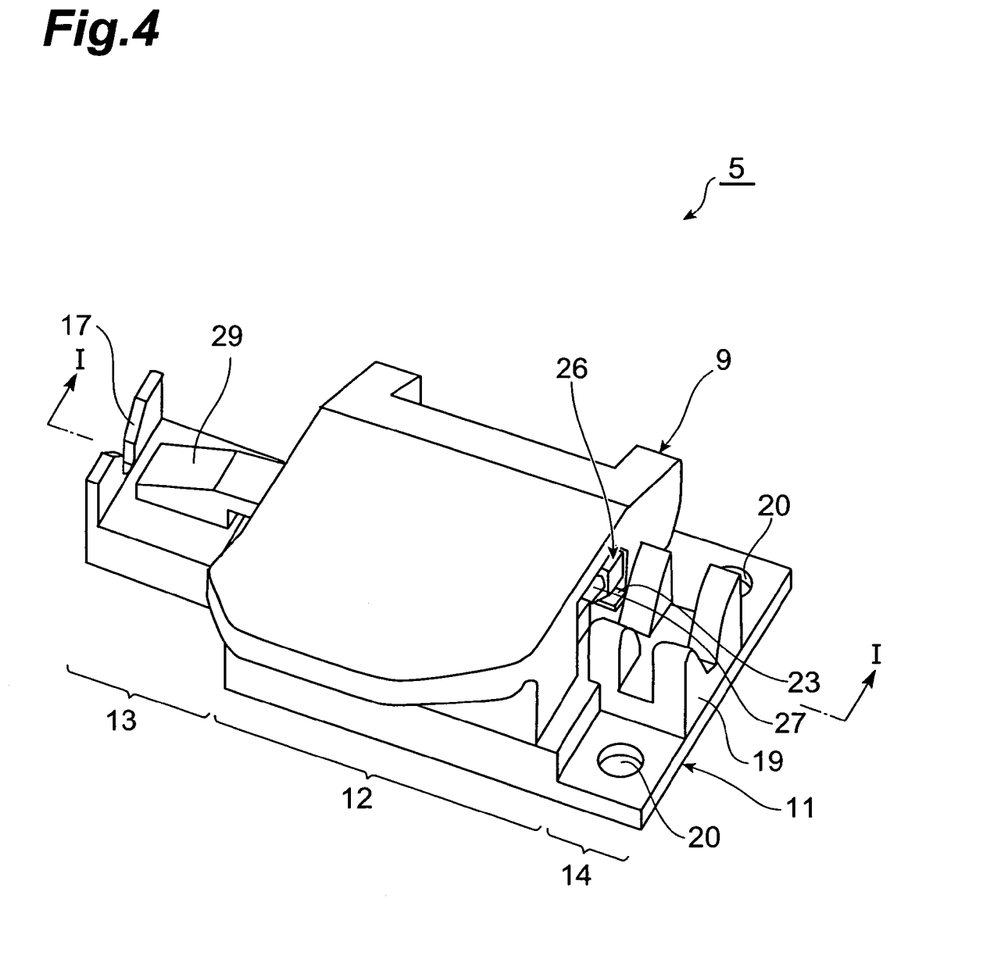
FIG. 4 is a perspective view of the assembled optical fiber holding apparatus shown in FIG. 2 in which the stage and the lid section are set to a first posture (a state that the lid section is closed)

A lid section 9, which covers the tube 3 loaded on the stage 11, is hinged on one side portion of the main body 12 in a rotatable state via axle 21. Owing to this arrangement, the lid section 9 can change its position about the axle 21. For example, a first posture in which the lid section 9 exposes the loading plane of the stage 11 as shown in FIG. 3 and a second posture in which the lid section 9 covers the loading plane of the stage 11 as shown in FIG. 4 can be achieved. The lid section 9 is provided with a magnet 22 and a metal plate 23. The magnet 22 and the metal plate 23 are disposed at the portions, in the second posture that the lid section 9 covers the stage 11, corresponding to the two magnets 16 of the stage 11. The magnet 22 has a rectangular solid shape as same as the magnet 16 and is embedded in a groove 24 formed in the lid section 9. The metal plate 23 is composed of, for example, a magnetic material such as iron and fixed to the lid section 9 with screws 25. Needles to say that a magnet may be used in place of the metal plate 23. As described above, owing to the magnetic force generated between the magnet 22, the metal plate 23 and the magnets 16, the second posture of the lid section 9 can be easily maintained.

In the rear face side of the lid section 9 (abutment face of the lid section 9 facing the loading plane of the stage 11 in the first posture), a groove 26a, which extends along the axis line L when the lid section 9 is closed with respect to the stage 11, is formed, and within the groove 26a, an arm 26 is mounted. That is, the base end portion of the arm 26 is hinged on the lid section 9 in a rotatable state via a shaft 27 provided so as to extend in the direction perpendicular to the axis line L. Moreover, receiving spaces for disposing two springs 28 between the lid section 9 and the arm 26 are formed in the lid section 9 and the arm 26.

A fiber holding section 29, which holds the front end portion of the coated optical fiber 2 exposed from the tube 3 onto the holding section 13 of the stage 11, is provided at the front end of the arm 26 (the end at the opposite side of the shaft 27). The fiber holding section 29 is formed so as to protrude from the lid section 9 with a predetermined length and thickness.

As described above, the springs 28 are disposed, not at a position immediately above the fiber holding section 29, but at a position between the arm 26 and the lid section 9 away from the fiber holding section 29. Therefore, a satisfactory space (buffering space A) can be ensured, at the position immediately above the fiber holding section 29 (refer to FIG. 7).

In the state that the loose fiber 4 is loaded on the stage 11 while the coated optical fiber 2 is held onto the stage 11 by the fiber holding section 29 (first posture), a space is formed between the arm 26 and the tube 3. That is, only the coated optical fiber 2 exposed from the tube 3 of the loose fiber 4 is held by the fiber holding section 29, but the arm 26 and the fiber holding section 29 are not abutted on the tube 3. Therefore, for example, even when the tube 3 is formed of a material hard to be deformed, the fiber holding section 29 is not prevented from holding the coated optical fiber 2 by the tube 3.

Moreover, the fiber holding section 29 is loaded with, for example, a cushioning member 30 of rubber material on the rear face thereof (the face which comes into contact with the coated optical fiber 2). By providing the cushioning member 30 at the fiber holding section 29 as described above, the coated optical fiber 2 is prevented from being damaged when the coated optical fiber 2 is held by the fiber holding section 29.

Figure 5:
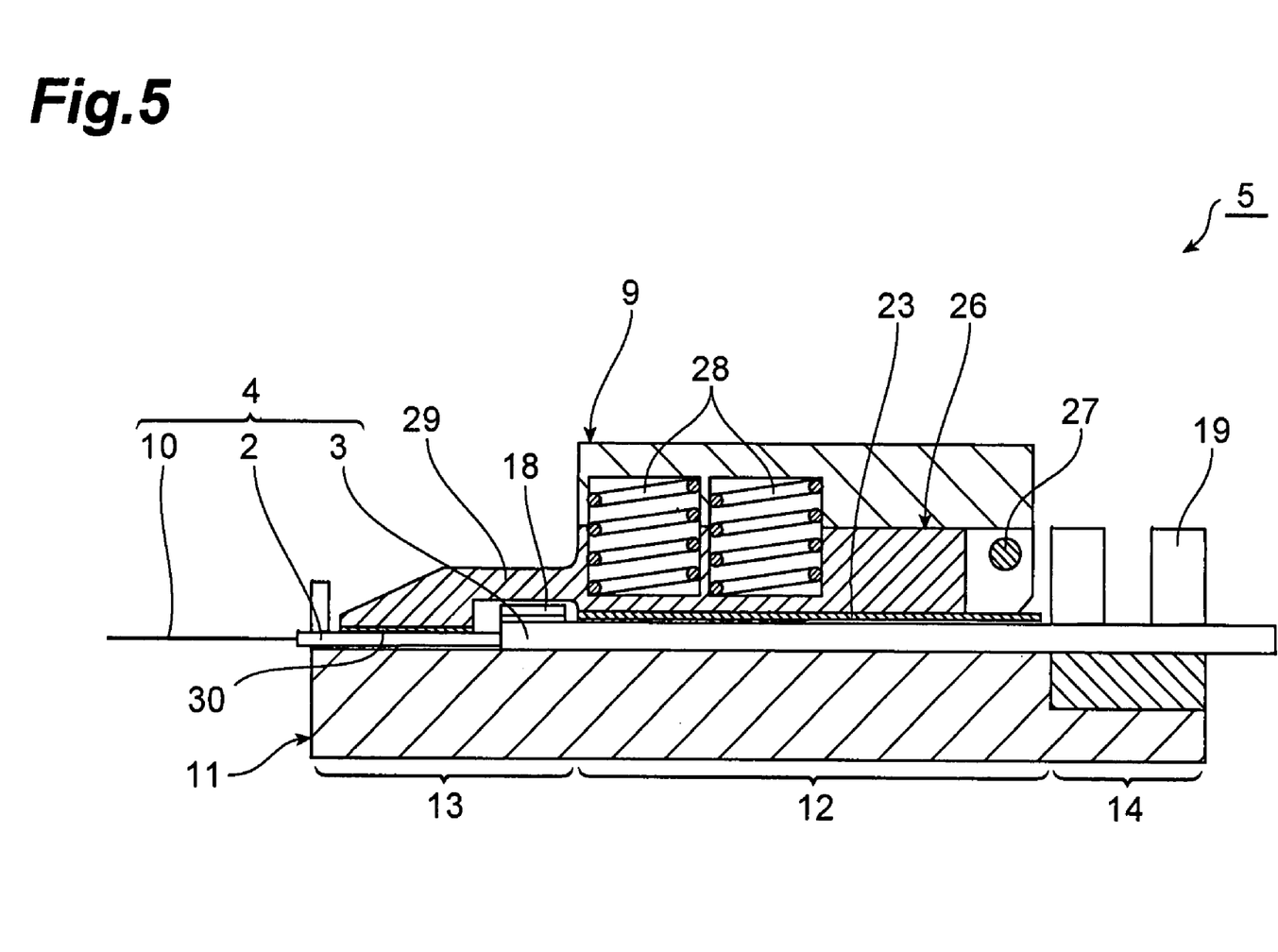
FIG. 5 is a cross-sectional view showing the structure of the optical fiber holding apparatus (in the second posture, a state that a loose tube fiber is placed) along the line I-I indicated in FIG. 4.

Here, FIG. 3 shows the optical fiber holding apparatus 5 in which the stage 11 and the lid section 9 are set to the second posture (the state that the loading plane of the stage 11 is exposed). FIG. 4 is a perspective view of the optical fiber holding apparatus 5 which is completed through the above-described assembling process, and the optical fiber holding apparatus 5 in which the stage 11 and the lid section 9 are set to the first posture (the state that the lid section 9 is closed). FIG. 5 is a cross-sectional view showing the structure of the optical fiber holding apparatus 5 taken along the line I-I shown in FIG. 4, and the optical fiber holding apparatus 5 is in the state that the loose fiber 4 is loaded in the second posture.

Next, the holding operation of the loose fiber 4 with the optical fiber holding apparatus 5 will be described with reference to the FIGS. 5 and 6.

When holding the loose fiber 4 with the optical fiber holding apparatus 5, which is constructed as described above, first of all, the loose fiber 4 is placed on the loading plane of the stage 11. Specifically, the coated optical fiber 2 exposed from within the tube 3 is positioned by the fiber guide 17, and the tube 3 itself is positioned by the tube guide 19 and the positioning section 18. At this time, the end face of the positioning section 18 and the boundary of the coated optical fiber 2 exposed from within the tube 3 coincide with each other (refer to FIG. 5). On the other hand, at the lid section 9 side, the fiber holding section 29 is in a non-contact state with the coated optical fiber 2 as shown in the area (a) of FIG. 6. In this state, since the arm 26 is imparted with a push out force F1 (biasing force) by the springs 28, the arm 26 rotates to move in the direction indicated with an arrow S1 about the shaft 27. However, the metal plate 23 limits the rotational movement of the arm 26 in the direction S1. Therefore, in the second posture where the loading plane of the stage 11 is exposed, the metal plate 23 functions as a stopper to limit the rotational movement of the arm 26.

Figure 6:
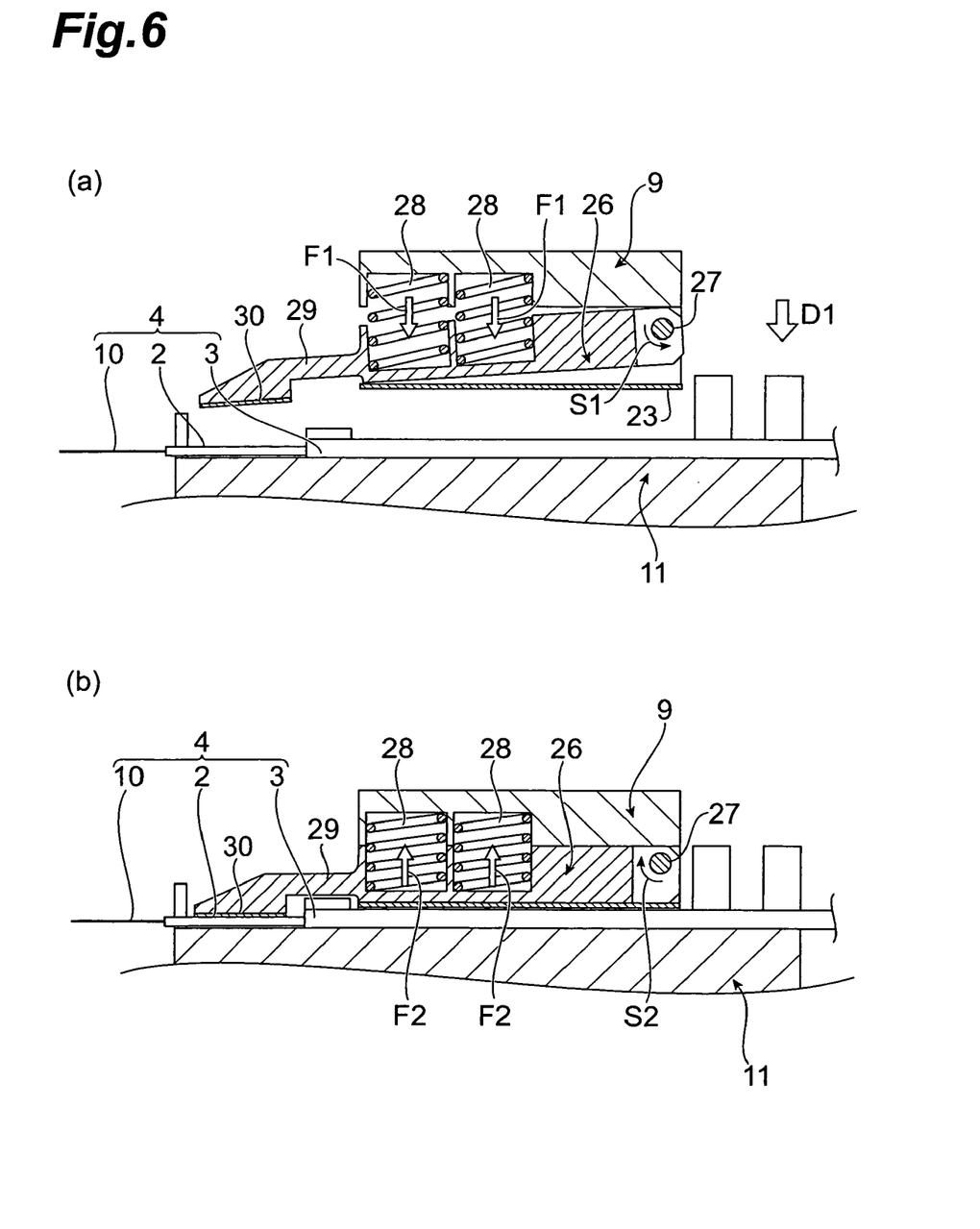
FIG. 6 is a cross-sectional view for illustrating holding operation of the loose tube fiber by the optical fiber holding apparatus according to the present invention.

Then, the lid section 9 is rotated to move about the axle 21 so that the fiber holding section 29 comes into contact with the coated optical fiber 2 and directly holds the coated optical fiber 2 as shown in the area (b) of FIG. 6 (first posture of the lid section 9). In the first posture, a repulsion force F2 acts on the springs 28 and the arm 26 rotates a little in the direction indicated with arrow S2. However, since the push out force (F1-F2) acting on the arm 26 due to the springs 28 works as a moment by the shaft 27 provided at the base end portion of the arm 26, the moment converges onto the fiber holding section 29 as a holding force for holding the coated optical fiber 2 and thus reliably holds the coated optical fiber 2 with the fiber holding section 29 and the holding section 13 on the stage 11.

Returning to FIG. 1, a pair of optical fiber holding apparatuses 5 as described above are mounted on the support bases 6 respectively so that each of the holding sections 13 is located opposing to each other. And the support base 6 and the optical fiber holding apparatus 5 are fixed to each other with screws 31 through the holes 20 formed in the fixing portion 14.

A pair of electrode rod supporting bases 8 is disposed between the support bases 6 facing each other in the direction perpendicular to the direction that the support bases 6 are positioned facing each other. The electrode rods 7, which protrude along the side of the optical fiber holding apparatuses 5 so as to face to each other, are mounted in the central area of the respective electrode rod supporting bases 8.

When fusion-splicing the loose fibers 4 with each other on the optical fiber fusion-splicing apparatus 1, first of all, the pair of optical fiber holding apparatuses 5, which has the structure as described above, hold the loose fibers 4 respectively. Then, a voltage is applied to the electrode rods 7 to generate arc discharge from the front ends of the electrode rods 7 to melt the bared fibers 10 at the front ends of the loose fibers 4. In the melted state as described above, the support bases 6 are moved in axial direction of the loose fibers 4 to cause the end faces of the bared fibers 10 to butt against each other and thereby the loose fibers 4 are connected to each other.

Here, in the loose fibers 4, when the coating portions of the coated optical fibers 2 are not held, the movement of the loose fibers 4 does not follow the movement of the stages 11 when the end faces of the bared fibers 10 in the loose fibers 4 are butted against each other, and accordingly the loose fibers 4 can not be satisfactorily connected to each other. Owing to this, the coating portions of the coated optical fibers 2 have to be satisfactorily held by the fiber holding sections 29 of the optical fiber holding apparatuses 5.

Figure 7:
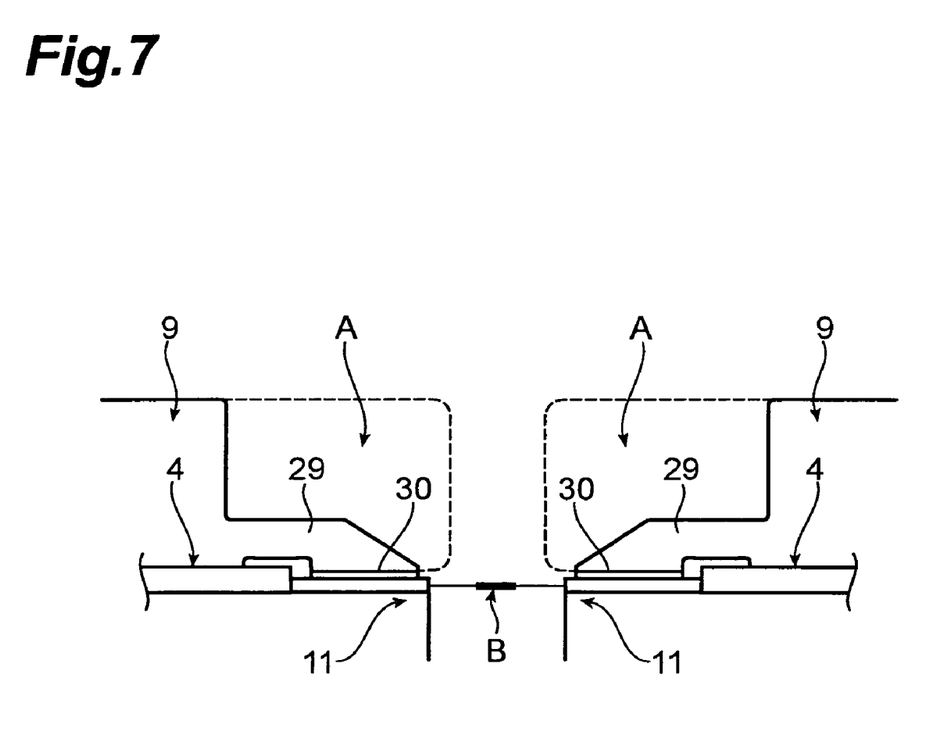
FIG. 7 is a schematic view for illustrating the effect of the optical fiber holding apparatus according to the present invention and the optical fiber fusion-splicing apparatus including the same.

On the other hand, in the optical fiber holding apparatus 5 according to the present invention, spaces (buffering spaces A) is ensured in the area immediately above the fiber holding section 29 as shown in FIG. 7, and the portion for holding the coated optical fiber 2 are designed compactly. Therefore, in order to miniaturize the optical fiber fusion-splicing apparatus 1, even when the distance between the optical fiber holding apparatuses 5 and the electrode rod supporting bases 8 is extremely small, the lid sections 9 are prevented from interfering with other components (for example, electrode rod supporting bases 8) while the lid sections 9 are opened/closed. FIG. 7 is a schematic view illustrating the effect of the optical fiber holding apparatus according to the present invention and the optical fiber fusion-splicing apparatus including the same. The point B indicated in FIG. 7 is a fusion-bonded portion between the bared fibers 10.

If any air bubble or damage is included in the connected portion between the loose fibers 4 (fusion-bonded portion between the bared fibers 10 indicated with "B" in FIG. 7), the tensile strength of the fusion-bonded portion is remarkably reduced, which may cause a breakage or the like of the fibers afterward. To prevent such problem, the optical fiber fusion-splicing apparatus 1 is given with the following proof test function. That is, after completing the fusion-splicing, in the state that the loose fibers 4 are held, the optical fiber holding apparatus 5 are moved backward, and a tensile force of, for example, approximately 200 (gf) is applied to the loose fibers 4 to previously break the failed connection between the loose fibers 4. Here, if the springs 28 do not have satisfactory biasing force, satisfactory fiber holding force cannot be obtained during the above test. That is, slippage occurs on the loose fibers 4 resulting in incorrect tensile test.

With respect to the above-mentioned problem, in the optical fiber holding apparatus 5 according to the present invention, the arm 26 is rotatably connected to the lid section 9 by the shaft 27 provided at the base end portion of the arm 26. Further, the springs 28 disposed between the arm 26 and the lid section 9 push out the arm 26 with the biasing force thereof. Thus, the biasing force of the springs 28 is transmitted to the fiber holding section 29 via the shaft 27 to generate the fiber holding force between the fiber holding section 29 and the stage 11. Therefore, even in such a structure that the springs 28 and the lid section 9 are disposed at the position away from the fiber holding section 29, the biasing force of the springs 28 is converged and transmitted onto the fiber holding section 29 only. Thus, a satisfactorily strong press force (fiber holding force) can be generated on the coated optical fibers 2. As a result, a satisfactory fiber holding force to meet the proof test, which is carried out after completing the fusion-splicing, can be obtained, and the slippage of the loose fiber 4 is effectively prevented to enable correct tensile test.

As seen from the above disclosure, according to the present invention, the optical fiber fusion-splicing apparatus 1 can be miniaturized while ensuring satisfactory holding of the loose fibers 4 with the optical fiber holding apparatus 5 without reducing the dimensions of the springs 28 in particular.

It is to be noted that the present invention is not limited to the above-described embodiments. For example, in the above embodiments, the optical fiber holding apparatus 5 has such a structure that two springs 28 are disposed between the lid section 9 and the arm 26. However, for example, if a satisfactory biasing force for holding coated optical fiber 2 is obtained, a single spring 28 will do. Or, when a stronger holding force is required, three or more springs 28 may be disposed along the longitudinal direction of the arm 26.

In the above-described embodiments, such a construction has been shown that the loose fibers 4 having the coated optical fibers 2 inserted through the tubes 3 are held and melted to connect to each other. However, the present invention is applicable for holding ordinary optical fibers and melting the same to connect to each other.

Further, in the above-described embodiments, the optical fiber holding apparatus 5 is mounted on the optical fiber fusion-splicing apparatus 1. However, the optical fiber holding apparatus 5, according to the present invention may be applied to other apparatus.

As described above, in accordance with the present invention, while holding the coated optical fibers with a satisfactory force, interference between the optical fiber holding apparatus and the other components can be avoided. Furthermore, for example, recent tendency toward miniaturization of the optical fiber fusion-splicing apparatus can be effectively dealt with.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber holding apparatus for holding at least front-end portion of an optical fiber, comprising:
   a stage having a loading plane on which the front-end portion of the optical fiber is placed and a loading structure provided on the loading plane for placing the front-end portion of the optical fiber along a predetermined direction;
   a lid section connected to said stage so as to enable, at least, a first posture sandwiching the front-end portion of the optical fiber together with said stage and a second posture exposing the loading plane of said stage;
   an arm having one end thereof rotatably connected to an abutment face of said lid section facing the loading plane of said stage in the first posture, said arm extending along the predetermined direction and having such a length that the other end thereof is positioned at the outside of the abutment face of said lid section;
   a fiber holding section provided at the other end of said arm for pressing a part of the optical fiber onto the loading plane of said stage; and
   an elastic member disposed between said lid section and said arm, said arm having a biasing force for pushing out the other end of the arm from the loading plane of the lid section with a constant pressure.

2. An optical fiber holding apparatus according to claim 1, wherein said arm has such a shape that, when said lid section and said stage are in the first posture, a portion excluding the other end provided with said fiber holding section is spaced from the loading plane of said stage.

3. An optical fiber holding apparatus according to claim 1, wherein said lid section includes a stopper member provided at the abutment face of said lid section, said stopper member restricting the movement of the other end of said arm with respect to the loading plane of said lid section.

4. An optical fiber holding apparatus according to claim 1, wherein said fiber holding section, provided at the other end of said arm, includes a cushioning member provided at the face facing the loading plane of said stage in the first posture.

5. An optical fiber fusion-splicing apparatus for fusion-splicing optical fibers with the respective ends butted against each other, comprising:
   first and second fiber holding apparatuses each having the same structure as that of an optical fiber holding apparatus according to claim 1, and each being disposed on a predetermined installation surface such that the loading direction of the front end portions of the optical fibers coincide with each other; and
   a discharge means for discharging into a space sandwiched between said first and second optical fiber holding apparatuses.

* * * * *